June 2, 1925.
N. STATHAM
1,539,966
DISTILLATION APPARATUS AND PROCESS FOR PRODUCING ACETONE
Original Filed Jan. 28, 1919
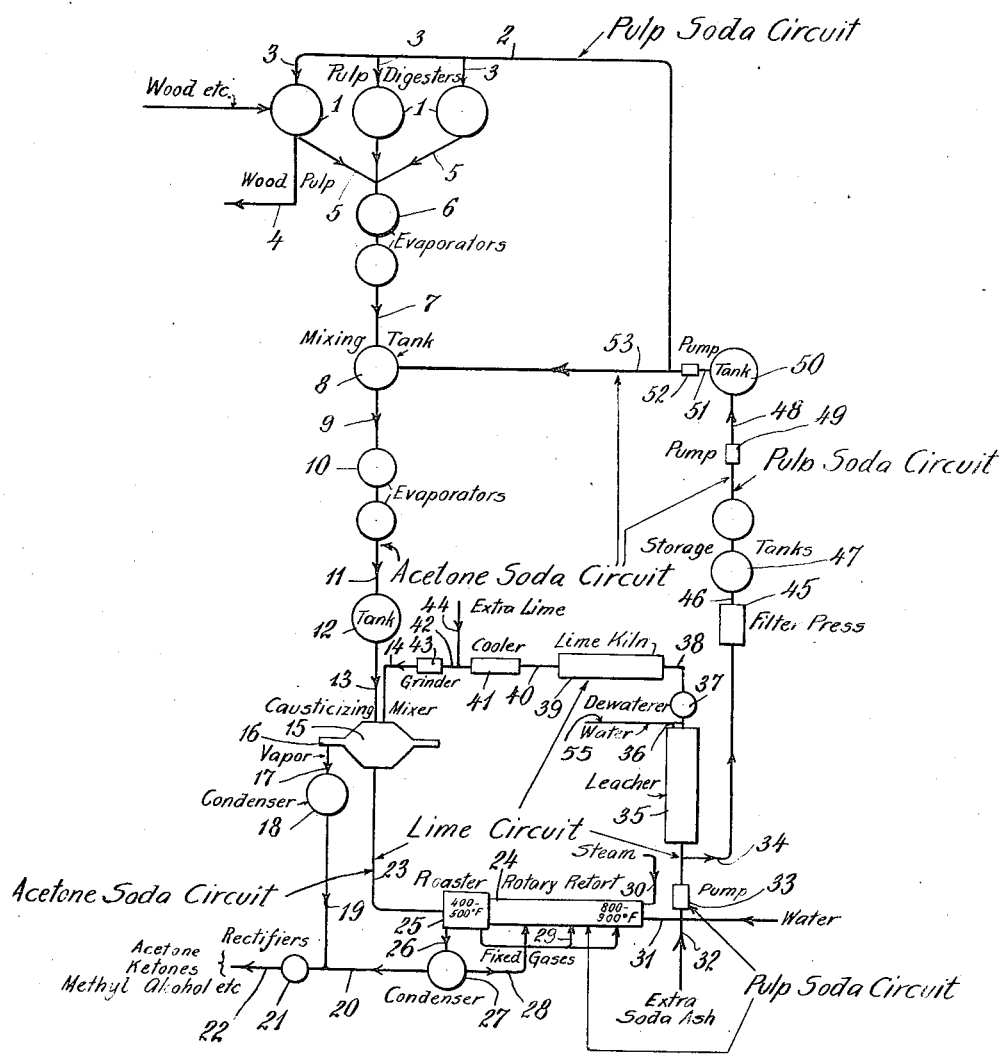
Inventor
Noel Statham
By his Attorney
Harry L. Duncan Patented June 2, 1925.

1,539,966

UNITED STATES PATENT OFFICE.

NOEL STATHAM, OF HASTINGS-ON-HUDSON, NEW YORK.

DISTILLATION APPARATUS AND PROCESS FOR PRODUCING ACETONE.

Application filed January 28, 1919, Serial No. 273,539. Renewed December 6, 1921. Serial No. 520,402.

*To all whom it may concern:*

Be it known that I, NOEL STATHAM, a subject of the King of Great Britain, now residing at Hastings-on-Hudson, county of Westchester, State of New York, have made a certain new and useful Invention Relating to Distillation Apparatus and Processes for Producing Acetone, of which the following is a specification, taken in connection with the accompanying drawing.

This invention relates especially to apparatus and processes for the production of acetone and other ketones and alcohols by the distillation of causticized organic material such as the waste liquors produced by the soda pulp process of making paper or other pulp from wood or similar material. Such soda waste liquor from the paper pulp digesters may be evaporated and additional caustic soda incorporated and combined therewith, and then preferably after further evaporation a large proportion of caustic lime may be incorporated with the concentrated waste liquor to causticize and convert it into a dry granular or porous mass containing considerable proportions of crude acetate material as well as other complex organic compounds of the soda and other alkali present. At this part of the process considerable vapors are given off which may be advantageously condensed and the wood alcohol and other valuable components recovered therefrom, the substantially dry causticized material being retorted preferably after a preliminary roasting treatment at moderate heats to develop and then efficiently distill the acetates and other compounds formed so as to produce acetone and other ketone bodies such as methyl ethyl ketone, wood alcohol, and the like. The material is finally preferably quite highly heated or carbonized in the retort, and is then leached to recover the soda and other valuable soluble components, the remaining material being freed from water and calcined as in a rotary lime kiln so that the reburned lime may be ground with whatever additional caustic lime is necessary for reuse in the causticizing operation. The caustic soda solution recovered may be passed through a filter press and pumped into tanks for mixture with the waste soda liquor from the digesters or for use as the soda cooking liquor in these wood pulp digesters so that a double soda circuit may thus be formed while the process involves a still more restricted lime circuit as is indicated in the accompanying diagram showing an illustrative embodiment of this process.

As indicated in the diagrammatic drawing any desired number of wood pulp digesters 1 may be used and may be supplied with the caustic soda cooking liquor from the soda supply pipe 2 as through various valved connections 3 to the digesters. A charge of wood chips or other similar fibrous material may be fed into one of the digesters and then the charge of caustic soda cooking liquor run into the same and the charge cooked or digested by steam under proper pressure and heat for a number of hours until the wood pulp is produced in the customary way. The waste soda liquor from the digester may then pass through the discharge pipes 5 into one or more evaporators 6 of any suitable construction, a series of multiple effect vacuum evaporators being desirable for this purpose, so as to concentrate the waste soda liquor passing through the pipe 7 to a specific gravity of approximately 1.30 so that it contains something like 50 percent of water. This concentrated waste soda liquor may be received into a mixing tank, such as 8, into which additional caustic soda may be supplied through the supply pipe 53 so that some 5 to 10 or even 15 percent of the weight of the concentrated waste soda liquor is added thereto. The pipe 9 may conduct this further causticized waste soda liquor to one or more evaporators 10 where it may be evaporated and the reaction of the soda allowed to take place more or less, the further concentrated liquor passing through a pipe 11 into a storage tank 12 from which it may be taken from time to time through a pipe 13 into the causticizing rotary or other mixer 15 where it is advantageously incorporated and combined with suitable amounts of caustic lime. Such caustic lime preferably in finely powdered condition may be supplied to the mixer through the conveyer or chute 14 communicating, if desired, with the grinder 43 and for causticizing and conversion of the hot concentrated and causticized waste liquor some 900 to 1200 or 1400 pounds of lime per ton of liquor may be used depending on the activity and heat of the lime and other conditions. These large quantities of hot quick lime naturally combine energetically with the hot concentrated waste liquor so as to develop considerable heat and highly heat the mixture as is indicated in my copending application which has matured into Patent 1,298,594, which states at line 59 of page 1: "The violent reaction caused by the lime under these conditions not only more or less causticizes the soda which is then largely present in the form of sodium carbonate or in organic combination, so that it can combine more effectively with some of the organic acid components, but also generates considerable heat and liberates a large amount of steam within the mass." Where freshly calcined quicklime from limestone is used in hot condition 900 or 1000 pounds is usually ample, but where the bulk of the lime used for this causticizing conversion treatment is produced by the reburning of the lime produced in this process considerably more may be used without serious disadvantage, it being desirable to use ample lime to actively combine with the organic components of the waste soda liquor with the elimination in the form of steam of some five to ten or twelve percent of the weight of the mixture so that a substantially dry or solid material of granular or porous form is produced which may be retorted conveniently and effectively during the acetone distillation as is described and claimed in the copending applications of Statham, 64,526, filed December 1, 1915, and abandoned May 8, 1919 and 220,463, filed March 5, 1918, now Patent No. 1,298,594, issued March 25, 1919, and the applications of Drewsen 246,330–1, filed July 23, 1918 now Patents Nos. 1,298,479–80, respectively, issued March 25, 1919.

After a charge of the causticized calcareous organic acetate material has been produced in the mixer 15 it may be conveyed or carried to the rotary retort 24 in any suitable way as through a conveyer line 23, the material preferably first passing into an enlarged diameter integral roaster section 25 of the retort where it may be heated to temperatures of 400 to 500 degrees Fahrenheit more or less for a number of hours, which seems to promote the formation of acetates in this causticized organic material containing such large proportions of combined lime and soda. The combined roaster and rotary retort may of course be heated in any suitable way, the retort proper being preferably heated to gradually increasing temperatures toward its discharge end where the temperature of the retort shell and material may be 800° to 900° Fahrenheit more or less which thoroughly carbonizes the material and promotes the subsequent leaching treatment thereof. This material discharge from the retort through the screw conveyer 31, for instance, may be combined with additional soda ash carried by the conveyer or pipe 32 if it is previously dissolved and the entire mixture may be conveyed or discharged through the pump or conveyer device 33 into a rotary or other leacher 35 supplied with large quantities of water at its other end as through the pipe 55 so that the current of water passes through the leacher in a contrary direction to the movement of the carbonized retort residue which facilitates the gradual and effective leaching of the caustic soda and other soluble components therefrom before this soda leach liquor therefrom is discharged as through the pipe or conduit 34 communicating with a filter press 45, for instance. From here the material may be conveyed through the pipe 46 communicating with one or more storage tanks 47 from which a pump 49 may take the caustic soda liquor and discharge it through the pipe 48 into a storage tank 50 from which the pump 52 may withdraw it from time to time through the pipe 51 communicating with the soda supply pipe 2 of the pulp soda circuit, or with the supply pipe 53 of the acetone soda circuit including the mixer retort and other elements described.

The leached retort residue may be taken by a conveyor 36 from the leacher and passed through a dewaterer 37 of any desired construction so as to remove surplus water before the material is discharged by the conveyor 38 into a rotary or other lime kiln 39 in which it may be calcined to burn off the carbonized material and causticize the lime which may be discharged through the conveyor 40 and cooler 41 into a conveyor 42 communicating with the grinder 43. Additional lime may be introduced into this part of the lime circuit by the conveyor 44, some ten or twelve percent of the caustic lime used being preferably added in the form of freshly burned lime at each pass through the lime circuit; or if desired, a corresponding amount of crushed or granulated limestone may be added at the feed end of the lime kiln for calcination with the other material therein.

The vapors from the rotary retort and roaster chamber may be discharged through the vapor pipe 26 communicating with a scrubber and surface condenser 27 of any suitable construction where the condensible vapors are reduced to liquid form and conveyed through the pipe 20 to any suitable rectifying apparatus such as the column stills or rectifiers 21 where the different products may be separated and purified. The non-condensible or fixed gases from the rotary retort may be led through the pipe 28 from the condenser 27 from which they may be discharged in the desired amounts through the gas connections 29 leading to the various heating chambers of the rotary retort where they may be supplemented by such further amounts of gas or other fuel as may be desirable for this purpose. The vapors from the causticizing mixer 15 may be conveniently discharged through the hollow trunnion 16 thereof so as to pass through the vapor pipe 17 to the surface condenser 18 of any suitable construction, the condensed material passing as through the pipe 19 to the rectifier 21 for recovery of the valuable alcohol and other components. The valuable solvents from the rotary retort to which superheated steam is preferably supplied in considerable amounts through the steam pipe 30 may contain some five to ten percent or so of condensible alcoholic and ketone solvents, the ketones, such as acetone and methyl ethyl ketone and the like amounting to 50 to 70 pounds or less per ton of the original concentrated soda waste liquor from the digesters when it has been concentrated to about a 50 percent water basis. The wood alcohol recovered from the retort amounts to some 20 to 40 pounds more or less per ton of such concentrated black liquor, the proportions of these materials and also the yields varying considerably in accordance with the amounts of caustic soda incorporated with the original soda waste liquor and the conditions of the subsequent treatment and dry distillation steps of the process. This process makes it possible to recover some 90 to 95 percent of the soda present in the original waste soda liquors from the paper pulp digesters and the large proportion of lime used in the causticizing of the material usually causes a considerable excess of caustic lime in the retorted material which makes it possible to recover the leached soda liquor in caustic form thus making it unnecessary to further causticize this soda before reuse in the digesters.

This invention has been described in connection with a number of illustrative embodiments, forms, elements, proportions, sizes, arrangements, materials, temperatures, pressures, conditions, and methods of assembly and operation, to the details of which disclosure the invention is not of course to be limited, since what is claimed as new and what is desired to be secured by Letters Patent is set forth in the appended claims.

1. The apparatus for producing acetone from wood pulp waste liquor or the like which comprises a rotary causticizing mixer, a rotary dry distillation retort, conveyor means between said mixer and retort to supply material thereto, means for externally heating said retort to gradually increasing temperatures to dry distill and calcine the high lime causticized organic acetate material from said mixer and produce acetone therefrom, vapor connections communicating with said retort to remove the acetone vapors therefrom, connected condensing and rectifying apparatus for said vapors, a leacher, means to deliver the calcined material from said retort to said leacher, means to feed water through said leacher against the feed of the calcined material to thereby leach soda liquor therefrom, a rotary lime kiln to receive the leached calcined material and connections between said leacher and lime kiln comprising a dewaterer, means comprising a cooler and grinder to deliver the calcined quicklime from said lime kiln to said mixer to form a lime circuit and means to introduce additional lime for said mixer into said lime circuit, a soda liquor supply line connected to said leacher to receive leach liquor therefrom, a mixing tank adapted to receive concentrated soda waste liquor and connected with said soda supply line, evaporators connected to said mixing tank to evaporate the causticized mixture of waste liquor and soda and a connection between said evaporators and said causticizing mixer to form an acetone soda circuit in connection with said lime circuit, paper pulp digesters connected to said soda liquor supply line to receive soda digester liquor therefrom and concentrating evaporators connected to said digesters to receive the soda waste liquor therefrom and concentrate the same, and a connection between said evaporators and said mixing tank to form a pulp soda circuit in connection with said acetone soda circuit.

2. The apparatus for producing acetone from wood pulp waste liquor or the like which comprises a causticizing mixer, a rotary dry distillation retort, conveyor means between said mixer and retort to supply material thereto, means for externally heating said retort to gradually increasing temperatures to dry distill and calcine the high lime causticized organic acetate material from said mixer and produce acetone therefrom, vapor connections communicating with said retort to remove the acetone vapors therefrom, connected condensing and rectifying apparatus for said vapors, a leacher, means to deliver the calcined material from said retort to said leacher, means to feed water through said leacher against the feed of the calcined material to thereby leach soda liquor therefrom, a rotary lime kiln to receive the leached calcined material and connections between said leacher and lime kiln, means comprising a cooler and grinder to deliver the calcined quicklime from said lime kiln to said mixer to form a lime circuit, a soda liquor supply line connected to said leacher to receive leach liquor therefrom, a mixing tank adapted to receive concentrated soda waste liquor and connected with said soda supply line and supply the same to said causticizing mixer to form an acetone soda circuit in connection with said lime circuit, paper pulp digesters connected to said soda liquor supply line to receive soda digester liquor therefrom and concentrating evaporators connected to said digesters to receive the soda waste liquor therefrom and concentrate the same, and a connection between said evaporators and said mixing tank to form a pulp soda circuit in connection with said acetone soda circuit.

3. The apparatus for producing acetone from wood pulp waste liquor or the like which comprises a causticizing mixer, a rotary dry distillation retort, conveyor means between said mixer and retort to supply material thereto, a leacher, means to deliver the calcined material from said retort to said leacher, means to feed water through said leacher against the feed of the calcined material to thereby leach soda liquor therefrom, a rotary lime kiln to receive the leached calcined material and connections between said leacher and lime kiln, means to deliver the calcined quicklime from said lime kiln to said mixer to form a lime circuit, a soda liquor supply line connected to said leacher to receive leach liquor therefrom, a mixing tank adapted to receive concentrated waste liquor and connected with said soda supply line and supply the same to said causticizing mixer to form an acetone soda circuit in connection with said lime circuit, paper pulp digesters connected to said soda liquor supply line to receive soda digester liquor therefrom and concentrating evaporators connected to said digesters to receive the soda waste liquor therefrom and concentrate the same, and a connection between said evaporators and said mixing tank to form a pulp soda circuit in connection with said acetone soda circuit.

4. The apparatus for producing acetone which comprises a causticizing mixer, a distillation retort, a feeding conveyor between said mixer and retort, means to deliver the calcined material from said retort and leach soda liquor therefrom, a soda liquor supply line to receive said leach liquor, a mixing device adapted to receive concentrated soda waste liquor from paper pulp digesters and connected with said soda supply line and with said causticizing mixer to form an acetone soda circuit in connection with the lime circuit, and paper pulp digesters to receive soda digester liquor from said soda liquor supply line therefrom and concentrating evaporators connected to said digesters to receive the soda waste liquor therefrom and concentrate the same, and a connection between said evaporators and said mixing tank to form a pulp soda circuit in connection with said acetone soda circuit.

5. The apparatus for producing acetone which comprises a causticizing mixer, a distillation retort, a feeding conveyor between said mixer and retort, means to deliver the calcined material from said retort and leach soda therefrom, a soda liquor supply line to receive said leach liquor, a mixing device adapted to receive concentrated soda waste liquor from paper pulp digesters and connected with said soda supply line and with said causticizing mixer to form an acetone soda circuit in connection with the lime circuit.

6. The apparatus for producing acetone which comprises a causticizing mixer, a distillation retort, a feeding conveyor between said mixer and retort, condensing devices receiving and condensing vapor from said causticizing mixer and said distillation retort, means to deliver the calcined material from said retort and leach soda liquor therefrom, a soda liquor supply line to receive said leach liquor, a mixing device adapted to receive concentrated soda waste liquor from paper pulp digesters and connected with said soda supply line and with said causticizing mixer to form an acetone soda circuit in connection with the lime circuit.

7. The apparatus for producing acetone which comprises a rotary causticizing mixer, a tank and connections between said tank and said mixer for supplying thereto concentrated causticized waste soda liquor from paper pulp digesters, a rotary dry distillation retort formed with an enlarged diameter preliminary roaster chamber, conveyor means between said mixer and retort to supply material thereto, means for externally heating said roaster and the successive portions of said retort to gradually increasing temperatures to roast, dry distill and calcine the high lime causticized organic acetate material from said mixer, means to introduce superheated steam adjacent the hotter end of said rotary retorts, vapor connections communicating with the cooler end of said retort to remove the acetone vapors therefrom, connected condensing and rectifying apparatus for said vapors, conduits to deliver the fixed gases from said condensing apparatus to burn the same for heating said retort, a rotary leacher, means to deliver the calcined material from said retort to said leacher, means to feed water through said leacher against the feed of the calcined material to thereby leach soda liquor therefrom, a rotary lime kiln to receive the leached calcined material, connections between said leacher and lime kiln comprising a dewaterer, means comprising a cooler and grinder to deliver the calcined quicklime from said lime kiln to said mixer, and means to introduce additional caustic lime for said mixer into said lime circuit 8. The apparatus for producing acetone which comprises a rotary causticizing mixer, connections with said mixer for supplying thereto concentrated causticized waste soda liquor from paper pulp digesters, a rotary dry distillation retort formed with a preliminary roaster chamber, conveyor means between said mixer and retort to supply material thereto, means for externally heating the successive portions of said retort to gradually increasing temperatures to roast, dry distill and calcine the high lime causticized organic acetate material from said mixer, means to introduce superheated steam adjacent the hotter end of said rotary retorts, vapor connections communicating with the cooler end of said retort to remove the acetone vapors therefrom, connected condensing and rectifying apparatus for said vapors, a rotary leacher, means to deliver the calcined material from said retort to said leacher, means to feed water through said leacher against the feed of the calcined material to thereby leach soda liquor therefrom, a rotary lime kiln to receive the leached calcined material, connections between said leacher and lime kiln comprising a dewaterer, means comprising grinder to deliver the calcined quicklime from said lime kiln to said mixer, and means to introduce additional lime for said mixer into said lime circuit.

9. The apparatus for producing acetone which comprises a rotary causticizing mixer, connections with said mixer for supplying thereto concentrated causticized waste soda liquor from paper pulp digester, a rotary dry distillation retort, conveyor means between said mixer and retort to supply material thereto, means for externally heating the successive portions of said retort to gradually increasing temperatures to roast, dry distill and calcine the high lime causticized organic acetate material from said mixer, means to introduce superheated steam adjacent the hotter end of said rotary retorts, vapor connections communicating with the cooler end of said retort to remove the acetone vapors therefrom, connected condensing and rectifying apparatus for said vapors, a leacher, means to deliver the calcined material from said retort to said leacher, means to feed water through said leacher against the feed of the calcined material to thereby leach soda liquor therefrom, a rotary lime kiln to receive the leached calcined material, connections between said leacher and lime kiln, means comprising a grinder to deliver the calcined quicklime from said lime kiln to said mixer.

10. The process of producing acetone from waste soda liquor from wood pulp or the like which comprises concentrating the waste soda liquor from the wood pulp digesters and incorporating additional caustic soda therewith, incorporating and combining large quantities of caustic lime with said concentrated liquor to form a substantially solid high lime causticized organic acetate material and condensing the vapor produced during said lime causticizing action, gradually roasting, dry distilling and calcining said acetate material, leaching caustic soda liquor from the calcined distillation residue and supplying such soda liquor to the wood pulp digesters, and incorporating portions of said soda liquor with the soda waste liquor from said digesters, drying and calcining the leached distillation residue and using the same for said lime causticizing action.

11. The process of producing acetone from waste soda liquor from wood pulp or the like which comprises concentrating the waste soda liquor from the wood pulp digesters and incorporating and combining large quantities of caustic lime with said concentrated liquor to form a substantially solid high lime causticized organic acetate material and condensing the vapor produced during said lime causticizing action, gradually dry distilling and calcining said acetate material, leaching caustic soda liquor from the calcined distillation residue and supplying such soda liquor to the wood pulp digesters, and incorporating portions of said soda liquor with the soda waste liquor from said digesters, drying and calcining the leached distillation residue and using the same for said lime causticizing action.

12. The process of producing acetone from waste soda liquor from wood pulp or the like which comprises concentrating the waste soda liquor from the wood pulp digesters and incorporating and combining large quantities of caustic lime with said concentrated liquor to form a substantially solid high lime causticized organic acetate material, gradually dry distilling and calcining said acetate material, leaching caustic soda liquor from the calcined distillation residue and supplying such soda liquor to the wood pulp digesters, and incorporating portions of said soda liquor with the soda waste liquor from said digesters, calcining the leached distillation residue and using the same for said lime causticizing action.

13. The process of producing acetone from wood pulp waste liquor or the like which comprises concentrating the waste liquor from the digesters and incorporating and combining additional caustic soda therewith, incorporating and combining large quantities of caustic lime with said concentrated liquor to form a substantially solid high lime causticized organic acetate material and condensing the vapor produced during said lime causticizing action, dry distilling and calcining said acetate material, leaching caustic soda liquor from the calcined distillation residue and incorporating such soda liquor with the waste liquor from the digesters, calcining the leached distillation residue and using the same for said lime causticizing action.

14. The process of producing acetone from wood pulp waste liquor or the like which comprises concentrating the waste liquor from the digesters and incorporating and combining additional caustic soda therewith, incorporating and combining large quantities of caustic lime with said concentrated liquor to form a substantially solid high lime causticized organic acetate material, dry distilling and calcining said acetate material, leaching caustic soda liquor from the calcined distillation residue and incorporating such soda liquor with the waste liquor from the digesters.

15. The process of producing acetone from waste soda liquor from wood pulp or the like which comprises concentrating the waste liquor from the wood pulp digesters and incorporating and combining large quantities of caustic lime with said concentrated liquor to form a substantially solid high lime causticized organic acetate material and condensing the vapor produced during said lime causticizing action and gradually dry distilling said acetate material.

16. The process of producing acetone from wood pulp waste liquor or the like which comprises concentrating the waste liquor and incorporating and combining additional caustic soda therewith, incorporating and combining large quantities of caustic lime with said concentrated liquor to form a substantially solid high lime causticized organic acetate material and condensing the vapor produced during said lime causticizing action, and dry distilling and calcining said acetate material.

17. The process of decomposing an aqueous liquid containing a large amount of organic matter and capable of yielding valuable carbon compounds upon destructive distillation, which consists in intimately mixing such aqueous liquid in a concentrated condition with sufficient quicklime to heat up the mass to a temperature at which distillation occurs, then distilling off the volatile carbon compounds whereby the non-volatile residue is obtained separately from the volatile constituent, and calcining the calcium compounds contained in said residue at a sufficient temperature to substantially convert the same into quicklime adapted to be reused in said process.

18. The process of recovering alkaline compounds of alkali metals from aqueous liquids containing the same together with large amounts of organic matter in solution or suspension, which consists in intimately mixing with such liquids while in a concentrated condition a sufficient amount of quicklime to heat up the mass on standing to a temperature at which distillation occurs, delivering the mixture when in an approximately dry condition to a conveyor, introducing the mixture into a retort and therein distilling off volatile carbon compounds, dissolving and removing the soluble salts from the insoluble residue, and calcining the calcium compound contained in the resultant residue.

NOEL STATHAM.